(12) United States Patent
Lee

(10) Patent No.: US 8,211,192 B2
(45) Date of Patent: Jul. 3, 2012

(54) ENERGY CONTAINED WASTE TO ENERGY PROCESS AND SYSTEM

(76) Inventor: Ernest Lee, West Covina, CA (US)

(*) Notice: Subject to any disclaimer, the term of this patent is extended or adjusted under 35 U.S.C. 154(b) by 975 days.

(21) Appl. No.: 12/221,100

(22) Filed: Jul. 30, 2008

(65) Prior Publication Data

US 2010/0024299 A1 Feb. 4, 2010

(51) Int. Cl.
*B01J 7/00* (2006.01)
*C10J 3/08* (2006.01)
*C10J 3/32* (2006.01)
*C01B 6/24* (2006.01)
*C01B 3/24* (2006.01)

(52) U.S. Cl. ............... 48/197 R; 48/61; 48/62 R; 48/77; 48/85.2; 423/644; 423/650

(58) Field of Classification Search ............... 48/197 R, 48/61, 77, 89, 101; 423/644, 648.1
See application file for complete search history.

(56) References Cited

U.S. PATENT DOCUMENTS

| | | | | |
|---|---|---|---|---|
| 4,415,336 A | * | 11/1983 | Stasi et al. | 44/636 |
| 6,178,899 B1 | * | 1/2001 | Kaneko et al. | 110/346 |
| 2005/0081766 A1 | * | 4/2005 | McIntosh | 110/286 |
| 2006/0211899 A1 | * | 9/2006 | Lee | 585/241 |
| 2008/0128259 A1 | * | 6/2008 | Kostek et al. | 201/4 |

* cited by examiner

*Primary Examiner* — Matthew Merkling
(74) *Attorney, Agent, or Firm* — Raymond Y. Chan; David and Raymond Patent Firm

(57) ABSTRACT

An energy contained waste to energy process and system includes a waste treatment unit having a treatment chamber and including a pressurizing presser movably supported in the treatment chamber for pressing the energy contained waste in the treatment chamber until the air within the energy contained waste is squeezed out. A waste to energy conversion unit includes a conversion housing having a reaction chamber for receiving the energy contained waste from the treatment chamber, and a pyrolysis processor for pyrolysis processing the energy contained waste in the reaction chamber to decompose the energy contained waste into a fuel gas and powdered residue. An energy collection unit is communicated with the waste to energy conversion unit to collect the fuel gas and the powdered residue as an energy source for recycling use.

14 Claims, 5 Drawing Sheets

ENERGY CONTAINED WASTE TO ENERGY PROCESS AND SYSTEM

BACKGROUND OF THE PRESENT INVENTION

1. Field of Invention

The present invention relates to a waste processing system and the method thereof, and more particularly to an energy contained waste to energy process and system, which is capable of converting the non-recycle waste into energy resources in an environmentally-friendly manner.

2. Description of Related Arts

Trash processing has become one of the most pressing problems for almost all developed countries. There are two conventional methods in treating trash. The first method is to transport the trash to specific plants for burning and the second method is to transport the trash of appropriate categories to certain landfill zones for landfill.

According to the burning method, the trashes, such as rubber tires, are firstly shredded before burning. Such method has been proven to be unsatisfactory. For example, burning of dumped rubber tires releases huge amount of pollutants which inevitably increases the problem of air pollution in the region.

The landfill method may temporarily resolve the problem of trash processing. However, as the amounts of garbage are ever-increasing, there is simply not enough land for being filled with garbage. As land is one of the most important forms of property in any developed society like the US, this by no means an efficient and ideal way of processing garbage. Moreover, it is important to point out that most landfill garbage is meant to be easily degradable.

As a result, one may appreciate that the conventional treatment methods of dumped trashes are expensive, inefficient, and produce a substantial amount of pollutants which can seriously pollute the environment.

SUMMARY OF THE PRESENT INVENTION

A main object of the present invention is to provide an energy contained waste to energy process and system, which is capable of converting the non-recycle waste into energy resources in an environmentally-friendly manner.

Another object of the present invention is to provide an energy contained waste to energy process and system, which does not release pollutant to the ambient atmosphere. In other words, the present invention does not resolve the problem of cycling the energy contained waste at the cost of deteriorating environment.

Another object of the present invention is to provide an energy contained waste to energy process and system, wherein the energy contained waste is treated by a prolysis process that no oxygen is required to decompose the waste so as to minimize the air pollution during the waste treatment.

Another object of the present invention is to provide an energy contained waste to energy process and system, wherein the energy contained waste is decomposed into powdered residue and fuel gas as the energy resources for recycling use.

Another object of the present invention is to provide an energy contained waste to energy process and system, which is easy to operate, efficient, and reliable.

Another object of the present invention is to provide an energy contained waste to energy process and system, wherein no expensive or complicated mechanical structure is required to employ in the present invention in order to achieve the above mentioned objects. Therefore, the present invention successfully provides an economic and efficient solution not only for cycling the energy contained waste to form the energy resources but also for minimizing the pollution as the side effect so as to promote environmentally-friendly practices among the industry.

Accordingly, in order to accomplish the above objects, the present invention provides an energy contained waste to energy process, comprising the steps of:

(a) disposing the energy contained waste in a treatment chamber;

(b) pressing the energy contained waste in the treatment chamber until the air within the energy contained waste is squeezed out;

(c) feeding the energy contained waste into a reaction chamber from the treatment chamber; and (d) pyrolysing the energy contained waste in the reaction chamber to vaporize the energy contained waste such that the energy contained waste is decomposed into fuel gas and powdered residue to be collected as energy sources for recycling use.

The present invention further provides an energy contained waste to energy system, comprising:

a waste treatment unit having a treatment chamber and comprising a pressurizing presser movably supported in the treatment chamber for pressing the energy contained waste in the treatment chamber until the air within the energy contained waste is squeezed out;

a waste to energy conversion unit comprising a conversion housing having a reaction chamber for receiving the energy contained waste from the treatment chamber, and a pyrolysis processor for pyrolysis processing the energy contained waste in the reaction chamber to decompose the energy contained waste into a fuel gas and powdered residue; and an energy collection unit communicated with the waste to energy conversion unit to collect the fuel gas and the powdered residue as an energy source for recycling use.

These and other objectives, features, and advantages of the present invention will become apparent from the following detailed description, the accompanying drawings, and the appended claims.

DETAILED DESCRIPTION OF THE PREFERRED EMBODIMENT

Figure 1:
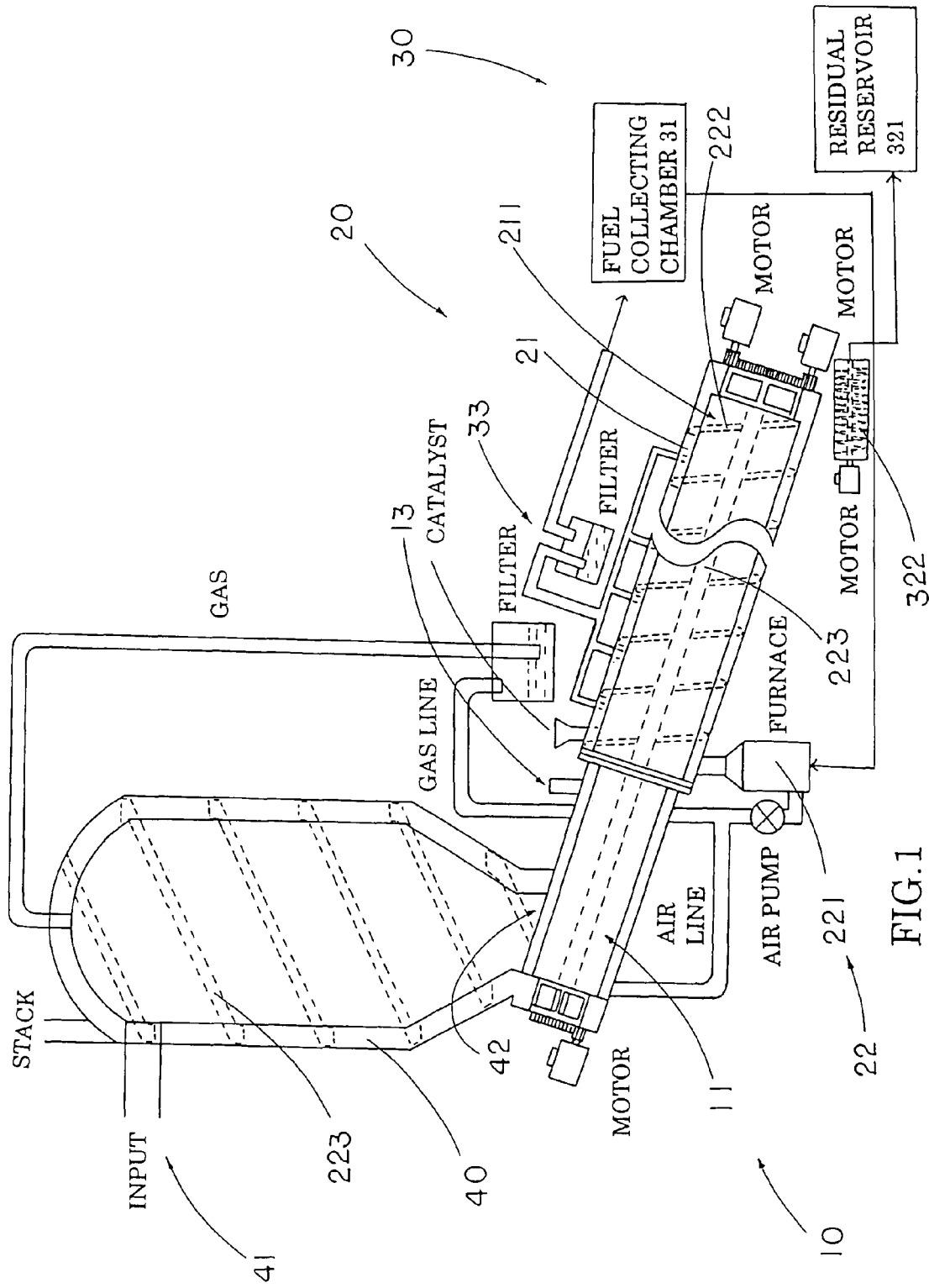
FIG. 1 is a schematic view of an energy contained waste to energy system according to a preferred embodiment of the present invention.

Referring to FIG. 1 of the drawings, an energy contained waste to energy system according to a preferred embodiment of the present invention is illustrated, wherein the energy contained waste to energy system comprises a waste treatment unit 10, a waste to energy conversion unit 20 and an energy collection unit 30.

The waste treatment unit 10 has a treatment chamber 11 and comprises a pressurizing presser 12 movably supported in the treatment chamber 11 for pressing the energy contained waste in the treatment chamber 11 until the air within the energy contained waste is squeezed out.

The waste to energy conversion unit 20 comprises a conversion housing 21 having a reaction chamber 211 for receiving the energy contained waste from the treatment chamber 11, and a pyrolysis processor 22 for pyrolysis processing the energy contained waste in the reaction chamber 211 to decompose the energy contained waste into a fuel gas and powdered residue.

The energy collection unit 30 is communicated with the waste to energy conversion unit 20 to collect the fuel gas and the powdered residue as an energy source for recycling use.

Figure 5:
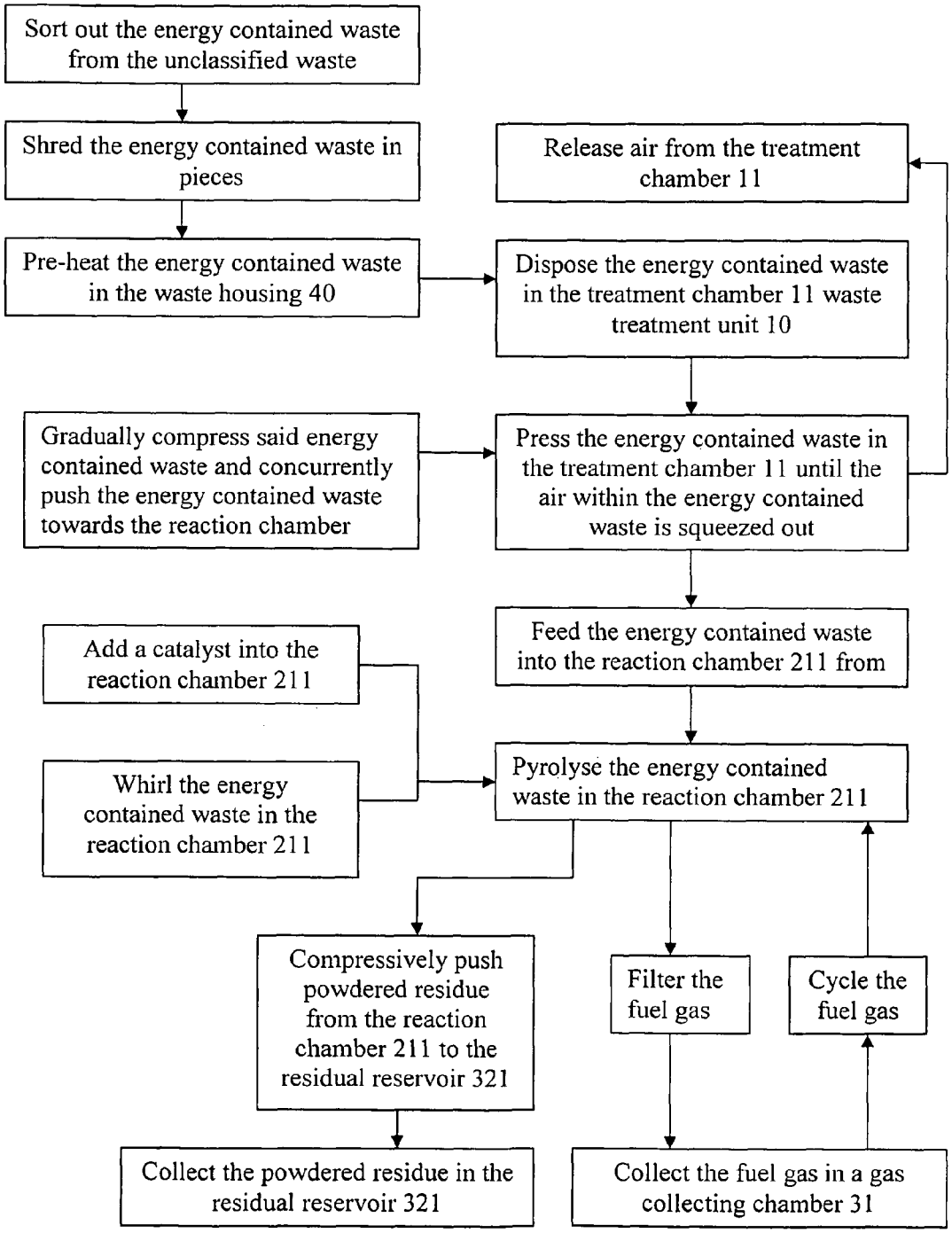
FIG. 5 is a flow diagram of an energy contained waste to energy process according to the above preferred embodiment of the present invention.

As shown in FIG. 5, the present invention further provides an energy contained waste to energy process, comprising the following steps.

(1) Dispose the energy contained waste in the treatment chamber 11 of the waste treatment unit 10.

(2) Press the energy contained waste in the treatment chamber 11 by the pressurizing presser 12 until the air within the energy contained waste is squeezed out.

(3) Feed the energy contained waste into the reaction chamber 211 from the treatment chamber 11.

(4) Pyrolyse the energy contained waste in the reaction chamber 211 to vaporize the energy contained waste such that the energy contained waste is decomposed into fuel gas and powdered residue to be collected as energy sources in the energy collection unit 30 for recycling use.

According to the preferred embodiment, before the step (1), the process further comprises the following pre-treatment steps.

(1.1) Sort out the energy contained waste from the unclassified waste, wherein the energy contained waste, such as cloth or fabric, is selected to be cycled in the present invention such that other waste, such as plastic or metal, are not fit to be used in the present invention.

(1.2) Shred the energy contained waste in pieces in order to fit into the treatment chamber 11.

As shown in FIG. 1, the system further comprises a waste housing 40 connected to the waste treatment unit 10 to communicate with the treatment chamber 11 for housing the energy contained waste after the energy contained is sorted out and shredded. The energy contained waste in the waste housing 40 is preheated before entering into the waste treatment unit 10. Accordingly, the waste housing 40 has a top opening 41 for receiving the energy contained waste and a bottom opening 42 communicating with the treatment chamber 11 such that the energy contained waste is automatically fed into the treatment chamber 11 by gravity.

Figure 2:
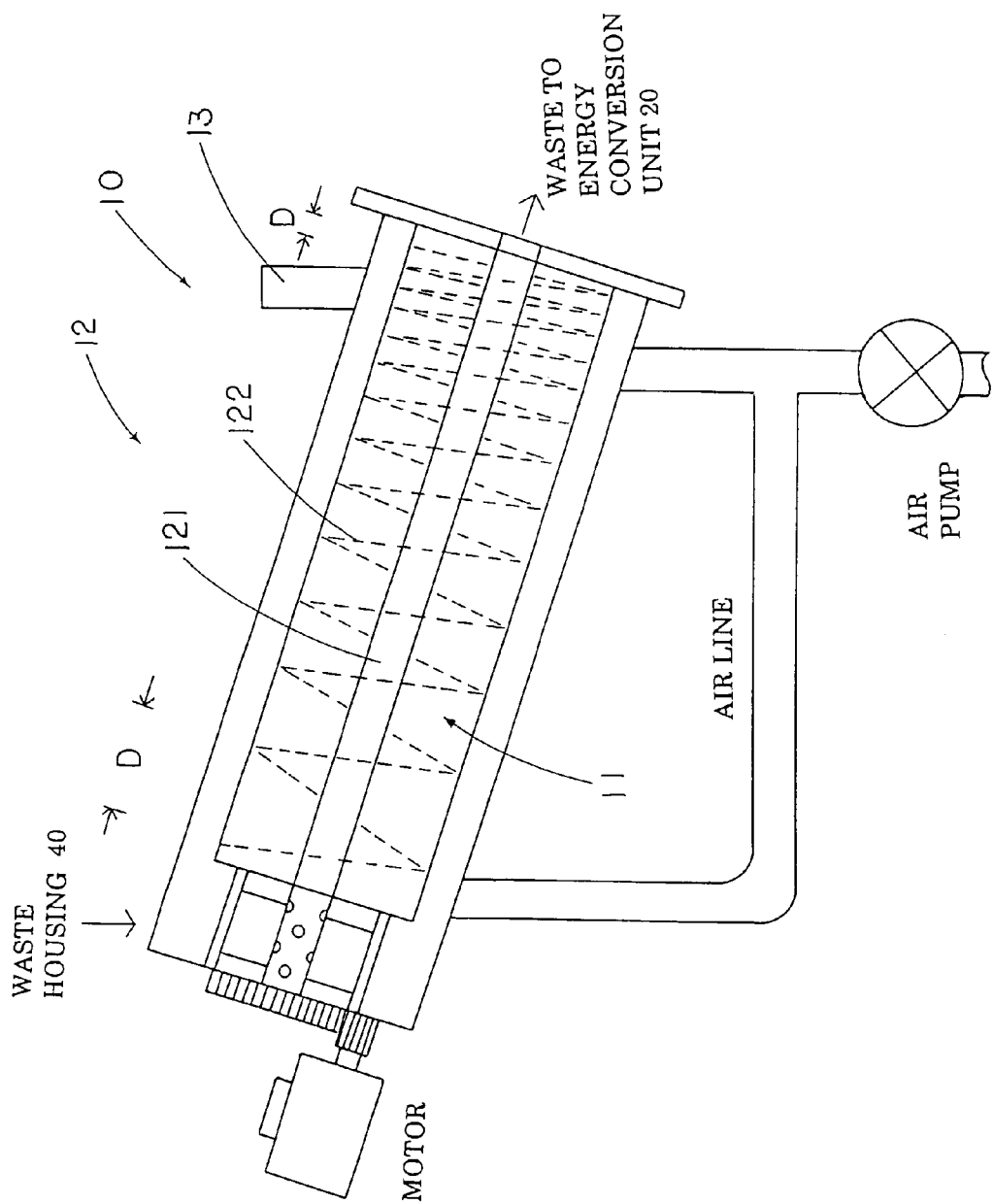
FIG. 2 is a schematic view of a waste treatment unit of the energy contained waste to energy system according to the above preferred embodiment of the present invention.

As shown in FIG. 2, the waste treatment unit 20 is a tubular housing that the treatment chamber 11 is an elongated channel for guiding the energy contained waste feeding from the waste housing 40 to the reaction chamber 211, wherein the treatment chamber 11 has a diameter approximately 8 inches.

The pressurizing presser 12 comprises a rotor shaft 121 rotatably supported along the treatment chamber 11 via a motor and a plurality of pusher fins 122 outwardly extended from the rotor shaft 121 in a spiral manner such that when the rotor shaft 121 is driven to rotate, the pusher fins 122 are driven for compressing the energy contained waste to squeeze out the air therewithin and concurrently pushing the energy contained waste towards the reaction chamber 211.

Accordingly, the pusher fins 122 are gradually reducing a pitch width D towards the reaction chamber 211 for gradually squeezing the air out from the energy contained waste and for substantially pushing the energy contained waste out of the treatment chamber 11. As shown in FIG. 2, the pitch width D is gradually narrowing down such that when the energy contained waste is disposed in the treatment chamber 11 from the waste housing 40, the energy contained waste is started to be pressed by the pusher fins 122. When the energy contained waste is pushed towards the reaction chamber 211 by rotating the rotor shaft 121, the energy contained waste is substantially squeezed to reduce its size with respect to the pitch width D of the pusher fins 122. Therefore, before entering into the reaction chamber 211, the energy contained waste is compressed until all the air is released therefrom.

In order to guide the energy contained waste to move towards the reaction chamber 211, the treatment chamber 11 is extended in an inclined manner that an inlet of the treatment chamber 11 which is connected to the bottom opening 42 of the waste housing 40 is positioned higher that an outlet of the treatment chamber 11 which is connected to a waste entrance of the conversion housing 21, such that the energy contained waste is slidably dropped down towards the reaction chamber 211 by gravity when the pressurizing presser 12 is rotated to push and press the energy contained waste to the reaction chamber 211. Therefore, in step (2), the energy contained waste is gradually compressed and concurrently pushed towards the reaction chamber 211.

The waste treatment unit 10 further has an air releasing outlet 13 communicatively extended from the treatment chamber 11 for releasing the air from the treatment chamber 11 when the energy contained waste is compressed by the pressuring presser 12. Therefore, in step (3), the air is released from the treatment chamber 11 before feeding into the reaction chamber 211 so as to ensure the reaction chamber 211 in a deoxygenated environment. It is worth to mention that since all the air is removed from the energy contained waste in the treatment chamber 11 before the energy contained waste enters into the reaction chamber 211, the reaction chamber 211 is concealed in a vacuum manner to prevent the air entering into the reaction chamber 211. In other words, no gate is required to form between the treatment chamber 11 and the reaction chamber 211 to block the air entering thereinto.

The conversion housing 21 is supported in an inclined manner that the waste entrance of the conversion housing 21 is positioned above a residual exit thereof such that the powdered residue is dropped towards the residual exit by gravity when the energy contained waste is decomposed within the reaction chamber 211. Accordingly, the conversion housing 21 is inclinedly supported at an inclination angle from a range of 17° to 30° for allowing the powdered residue dropping towards the residual exit by gravity. Accordingly, in step (4), the reaction chamber 211 is supported at an inclination angle that the powdered residue is downwardly dropped to the reaction chamber 211 by gravity after the energy contained waste is decomposed.

It is worth to mention that when the energy contained waste is fed from the treatment chamber 11 into the reaction chamber 211, the highly compressed energy contained waste will self-expand to its original size such that the heat within the reaction chamber 211 can be effectively applied to the energy contained waste for decomposition. In addition, the highly compressed energy contained waste will seal the waste entrance of the conversion housing 21 when the energy contained waste is continuously fed from the treatment chamber 11 into the reaction chamber 211 so as to prevent the air entering into the reaction chamber 211. In addition, a diameter of the reaction chamber 211 is larger than a diameter of the treatment chamber 11 such that the highly compressed energy contained waste can be fully expanded with its size when the energy contained waste is fed to the reaction chamber 211.

The conversion housing 21 further comprises a plurality of spinners 212 rotatably supported within the reaction chamber 211 for whirling the energy contained waste therein so as to effectively vaporize the energy contained waste within the reaction chamber 211. It is worth to mention that the energy contained waste is sunk at the bottom of the reaction chamber 211 such that the heat may not be substantially applied to the energy contained waste. Therefore, when the energy contained waste is whirled within the reaction chamber 211, the energy contained waste can be effectively decomposed. Accordingly, in order to whirl the energy contained waste in the reaction chamber, more than one motor can be used to power up the spinners 212 to substantially stir up the energy contained waste.

Figure 3:
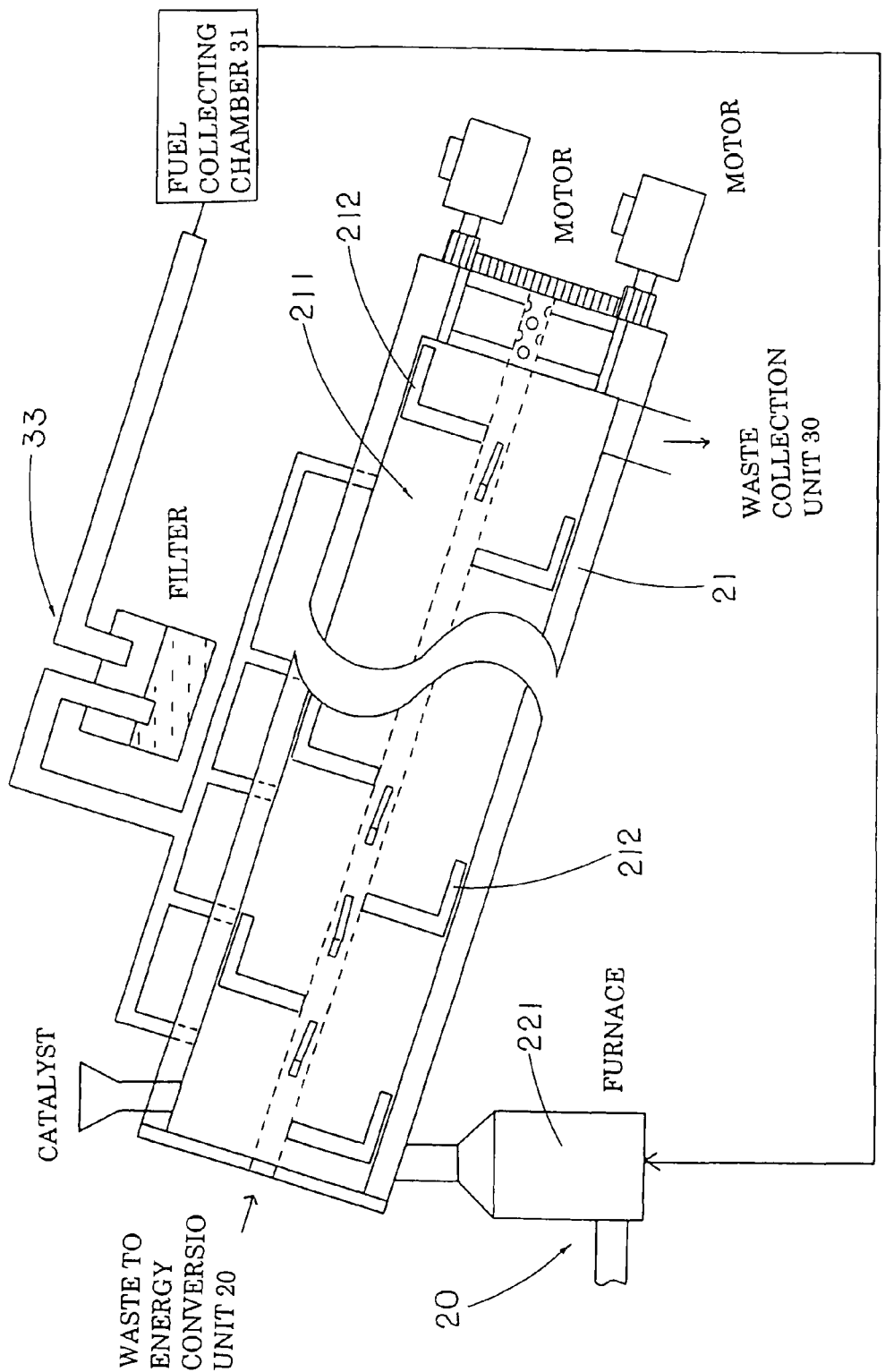
FIG. 3 is a schematic view of a waste to energy conversion unit of the energy contained waste to energy system according to the above preferred embodiment of the present invention.

The pyrolysis processor 22 of the waste to energy conversion unit 20 is adapted to increase the temperature of the energy contained waste within the reaction chamber 211 for decomposing the energy contained waste into the fuel gas and powdered residue for recycling use. As shown in FIG. 3, the pyrolysis processor 22 comprises a heat generator 221, such as furnace, connected to the reaction chamber 211 for heating up the reaction chamber 211 at a decomposed temperature such that after the energy contained waste is decomposed within the reaction chamber 211, the fuel gas and the powdered residue as the end products are formed and collected by the energy collection unit 30. Accordingly, the heat generator 221 generates heat within the reaction chamber 211 at the decomposed temperature under 1000° F. Preferably, the decomposed temperature of the reaction chamber 211 is from 500° F. to 800° F. depending on the properties of the energy contained waste.

According to the preferred embodiment, the step (4) further comprises a step of adding a catalyst into the reaction chamber 211 for enhancing the pyrolyse process of the energy contained waste. The catalyst is preferably a mineral compound or a petroleum product depending on the properties of the energy contained waste to speed up the pyrolyse process of the energy contained waste within the reaction chamber 211.

The pyrolysis processor 22 further comprises a heat guiding tube 222 encircling around an outer peripheral surface of the conversion housing 21 to heat up the reaction chamber 211 and a heat transporting tube 223 which is communicatively extended from the heat guiding tube 222 within the reaction chamber 211 to transmit the heat from the heat generator 221 to the waste housing 40 to pre-heat the energy contained waste therewithin. As shown in FIG. 1, a portion of the heat transporting tube 223 is extended within the reaction chamber 211 to guide the heat from the heat guiding tube 222 and a portion of the heat transporting tube 223 is extended to encircle the waste housing 40 to pre-heat the energy contained waste therein.

Moreover, it is worth to mention that the reaction chamber 211 must be kept at a deoxygenated environment, i.e. having no oxygen, so that when the energy contained waste is undergoing the pyrolysis process. Therefore, only the energy contained waste is fed into the reaction chamber 211 to prevent oxygen (air) entering into the reaction chamber 211 so as to remain a deoxygenated environment thereof during the pyrolysis process in step (4). The energy contained waste is treated by the pyrolysis process to minimize the air pollution in comparison with the conventional burning process that the waste is burned within an oxygen rich environment to generate air pollution.

The energy collection unit 30 comprises a gas collecting chamber 31 communicatively connected to the reaction chamber 211 for collecting the fuel gas and a residual collection unit 32 connected to the reaction chamber 211 at the residual exit for collecting the powdered reside after the energy contained waste is decomposed.

According to the preferred embodiment, the process further comprises the following steps.

(5) Collect the fuel gas in the gas collecting chamber 31, wherein the fuel gas is cycling used as a power supply to vaporize the energy contained waste.

The energy collection unit 30 further comprises gas filter 33 communicatively linked between the gas collecting chamber 31 and the reaction chamber 211 for filtering the fuel gas before entering into the gas collecting chamber 31 for cycling use. Accordingly, the fuel gas is stored in the gas collecting chamber 31 and is cycling used as a power supply of the heat generator 221 such that no additional fuel cost is required to supply the heat generator 221. In other words, after decomposing the energy contained waste to form the fuel gas, the fuel gas is cycling used back to generate heat to decompose the energy contained waste while being cost effective. Therefore, once the fuel gas is filtered by the gas filter 33, the clean fuel gas is ready to be recycling used.

Figure 4:
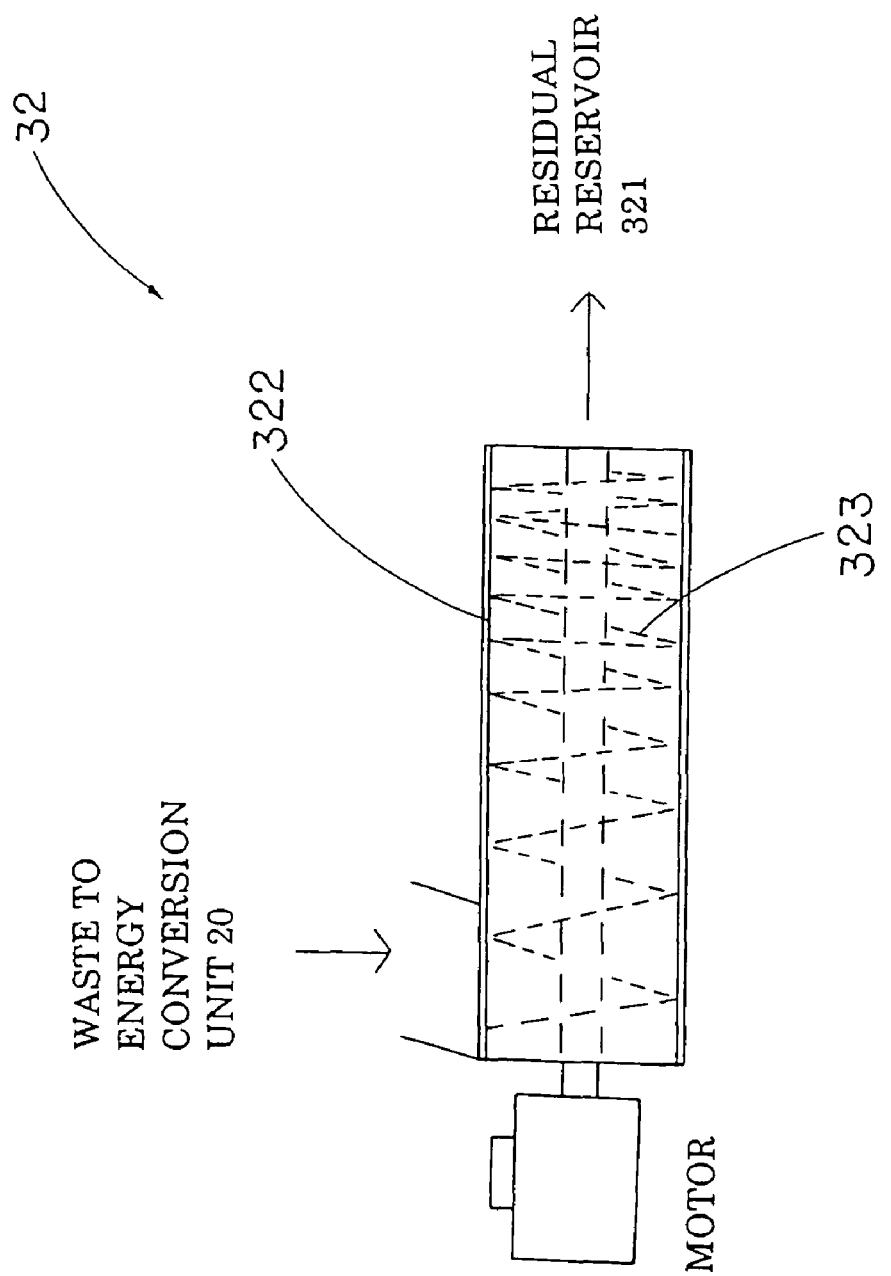
FIG. 4 is a schematic view of an energy collection unit of the energy contained waste to energy system according to the above preferred embodiment of the present invention.

As shown in FIG. 4, the residual collection unit 32 comprises a residual reservoir 321, a collection channel 322 communicatively extended from the residual exit of the reaction chamber 211 to the residual reservoir 321, and a residual presser 323 movably mounted along the collection channel 322 for compressively pushing the powdered residue to the residual reservoir 321. The powdered residue is embodied as the carbon black. Accordingly, the process further comprises the following step.

(6) Collect the powdered residue in the residual reservoir 321, wherein the powdered residue is compressively pushed from the reaction chamber 211 to the residual reservoir 321 for preventing air entering into the reaction chamber 211.

The residual presser 323 comprises a spiral rotor rotatably mounted within the collection channel 322 wherein the spiral rotor has a pitch width gradually reducing towards the residual reservoir 321 for substantially compressing and pushing the powdered residue towards the residual reservoir 321. It is worth to mention that air may enter into the reaction chamber 211 from the residual reservoir 321 during the transportation of the powdered residue. Accordingly, the powdered residue is highly compressed before entering into the residual reservoir 321 such that the compressed powdered residue seals the air entering into the reaction chamber 211 from the residual reservoir 321.

From the forgoing descriptions, it can be shown that the above-mentioned objects have been substantially achieved. The present invention effectively provides a method of processing the energy contained waste which is capable of converting the energy contained waste into several energy resources in an environmentally-friendly manner. Moreover, the present invention also successfully provides the pyrolysis system which is adapted to process the energy contained waste in accordance with the method mentioned.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An energy contained waste to energy process, comprising the steps of:
   (a) disposing an energy contained waste in a treatment chamber;
   (b) pressing said energy contained waste in said treatment chamber until said air within said energy contained waste is squeezed out;
   (c) feeding said energy contained waste into a reaction chamber from said treatment chamber in a gate-less manner, wherein said energy contained waste is gradually compressed and concurrently pushed toward said reaction chamber via a plurality of pusher fins extending in a spiral manner, wherein said pusher fins are gradually reducing a pitch width thereof towards said reaction chamber for gradually squeezing said air out from said energy contained waste and for substantially pushing said energy contained waste out of said treatment chamber; and
   (d) pyrolysing said energy contained waste in said reaction chamber to vaporize said energy contained waste, wherein said energy contained waste in said reaction chamber is whirled to effectively vaporize said energy contained waste, such that said energy contained waste is decomposed into fuel gas and powdered residue to be collected as energy sources for recycling use;
   wherein, in step (d), said reaction chamber is supported at an inclination angle that said powdered residue is downwardly dropped to said reaction chamber by gravity after said energy contained waste is decomposed;
   wherein, in the step (d), said energy contained waste is whirled in said reaction chamber by a plurality of spinners to effectively vaporize said energy contained waste, wherein said spinners are rotatably supported within said reaction chamber to stir said energy contained waste in said reaction chamber.

2. The process as recited in claim 1, in step (d), further comprising a step of adding a catalyst into said reaction chamber for enhancing said pyrolyse process of said energy contained waste.

3. The process as recited in claim 1, in the step (b), wherein said energy contained waste is compressed and concurrently pushed towards said reaction chamber through a rotor shaft rotatably supported along said treatment chamber, wherein said pusher fins are outwardly extended from said rotor shaft in a spiral manner such that when said rotor shaft is driven to rotate, said pusher fins are driven for compressing said energy contained waste to squeeze out said air therewithin and concurrently pushing said energy contained waste towards said reaction chamber.

4. The process as recited in claim 2, in the step (b), wherein said energy contained waste is compressed and concurrently pushed towards said reaction chamber through a rotor shaft rotatably supported along said treatment chamber, wherein said pusher fins are outwardly extended from said rotor shaft in a spiral manner such that when said rotor shaft is driven to rotate, said pusher fins are driven for compressing said energy contained waste to squeeze out said air therewithin and concurrently pushing said energy contained waste towards said reaction chamber.

5. The process as recited in claim 2, in step (c), further comprising a step of releasing said air from said treatment chamber before feeding into said reaction chamber so as to ensure said reaction chamber in a deoxygenated environment.

6. The process as recited in claim 4, in step (c), further comprising a step of releasing said air from said treatment chamber before feeding into said reaction chamber so as to ensure said reaction chamber in a deoxygenated environment.

7. The process as recited in claim 2, further comprising the steps of:
   (e) collecting said fuel gas in a gas collecting chamber, wherein said fuel gas is cycling used as a power supply to vaporize said energy contained waste; and
   (f) collecting said powdered residue in a residual reservoir, wherein said powdered residue is compressively pushed from said reaction chamber to said residual reservoir for preventing air entering into said reaction chamber.

8. The process as recited in claim 6, further comprising the steps of:
   (e) collecting said fuel gas in a gas collecting chamber, wherein said fuel gas is cycling used as a power supply to vaporize said energy contained waste; and
   (f) collecting said powdered residue in a residual reservoir, wherein said powdered residue is compressively pushed from said reaction chamber to said residual reservoir for preventing air entering into said reaction chamber.

9. The process as recited in claim 7, in step (e), further comprising a step of filtering said fuel gas before said fuel gas is stored in said gas collecting chamber for cycling use.

10. The process as recited in claim 8, in step (e), further comprising a step of filtering said fuel gas before said fuel gas is stored in said gas collecting chamber for cycling use.

11. The process as recited in claim 6, before the step (a), further comprising the step of pre-heating said energy contained waste before entering into said treatment chamber.

12. The process as recited in claim 10, before the step (a), further comprising the step of pre-heating said energy contained waste before entering into said treatment chamber.

13. The process as recited in claim 11, before the step (a), further comprising the pre-treatment steps of:
   (a.1) sorting out said energy contained waste from an unclassified waste; and
   (a.2) shredding said energy contained waste in pieces in order to fit into said treatment chamber.

14. The process as recited in claim 12, before the step (a), further comprising the pre-treatment steps of:
   (a.1) sorting out said energy contained waste from an unclassified waste; and
   (a.2) shredding said energy contained waste in pieces in order to fit into said treatment chamber.

* * * * *